United States Patent

[11] 3,565,376

[72] Inventor: Homer J. Viers, Flint, Mich.
[21] Appl. No.: 847,247
[22] Filed: Aug. 4, 1969
[45] Patented: Feb. 23, 1971
[73] Assignee: General Motors Corporation, Detroit, Mich.

[54] TUBING SUPPORT
10 Claims, 5 Drawing Figs.

[52] U.S. Cl. ................................................ 248/68; 248/73
[51] Int. Cl. ................................................ F16l 3/22
[50] Field of Search ................................ 248/68, 73, 225, 224; 24/81 (B), 81.3, 73.7, 73 (B)

[56] References Cited
UNITED STATES PATENTS

| | | | |
|---|---|---|---|
| 2,278,691 | 4/1942 | Cotter | 248/73X |
| 2,852,829 | 9/1958 | Holton | 24/73 |
| 3,113,754 | 12/1963 | Jansson | 24/81.3X |

FOREIGN PATENTS

| | | | |
|---|---|---|---|
| 709,926 | 6/1954 | Great Britain | 24/81.3 |

Primary Examiner—Chancellor E. Harris
Attorneys—Paul Fitzpatrick and Jean L. Carpenter ABSTRACT: An arrangement for supporting tubing and the like on a base such as a vehicle frame includes a spring clip which is slid into place between the frame and a tongue struck out from the frame, the clip, frame and tongue defining a closed loop around the tubing. The clip has flanges which locate it laterally with respect to the tongue and a spur which engages the frame to hold it inserted.

PATENTED FEB 23 1971

3,565,376

INVENTOR.
Homer J. Viers
BY
Paul Fitzpatrick
ATTORNEY

TUBING SUPPORT

My invention relates to supports for elongated members such as piping, tubing, wiring, and the like, and is particularly suitable for installations on automotive vehicle frame members although suitable for other purposes. It also relates to a clip particularly suited for retention of such elongated members on these plates.

The principal objects of my invention are to facilitate installation of elongated members upon bases such as automobile chassis members, to provide a readily installed clip which provides firm and positive support for such members, and to provide a combination of base plate and clip which provides a readily installed, positively retained, and readily disassembled means for supporting runs of tubing and the like on a support.

The nature of my invention and its advantages will be clear to those skilled in the art from the succeeding detailed description of the preferred embodiment of the invention and the accompanying drawings thereof.

Figure 1:
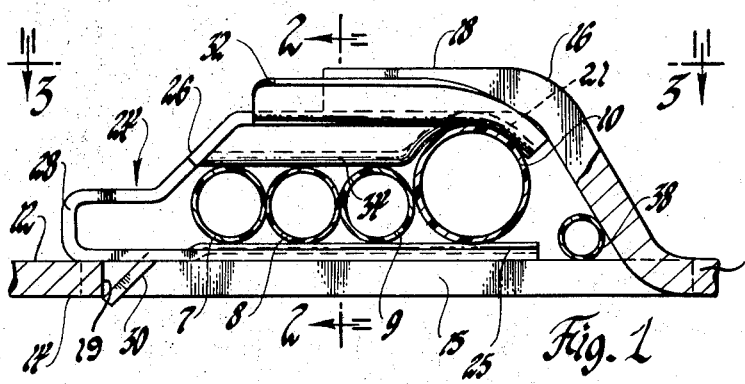
FIG. 1 is a sectional view of a completed installation of tubing on a vehicle frame.
Figure 2:
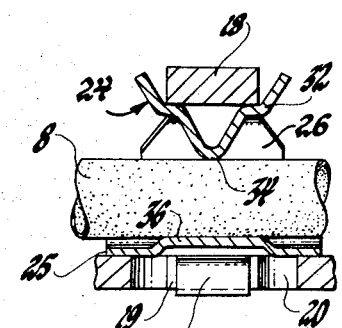
FIG. 2 is a sectional view of the same taken on the plane indicated by the line 2-2 in FIG. 1.
Figure 3:
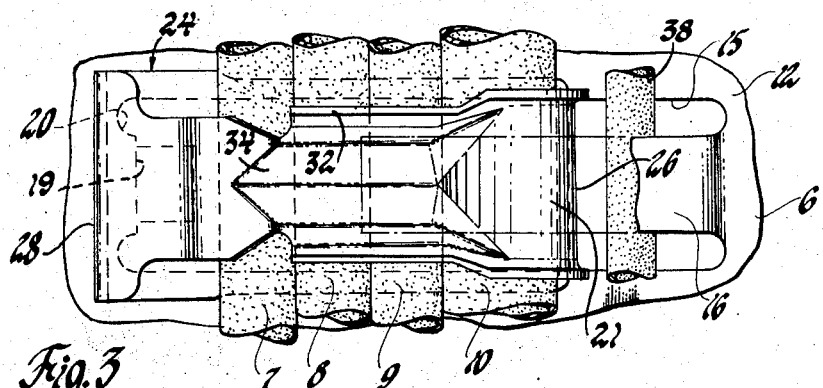
FIG. 3 is a view of the same taken on the plane indicated by the line 3-3 in FIG. 1.

By way of introduction to the detailed description of the preferred installation, it may be pointed out that it involves a frame or supporting plate which has a tongue struck from it and extending over the surface of the plate and involves a generally U-shaped clip which slides into place between the plate and the tongue to define a closed loop around tubing or other elongated members. The clip includes means holding it in position but so that it may be removed, if desired, without special tools and may incorporate structure to provide a close fit on tubing of different diameters retained in the clip.

Such a device is becoming increasingly needed in view of increasing numbers of tubes running from front to rear of automotive vehicles.

Referring to the drawings, a support plate 6, which may specifically be a portion of the frame of an automotive vehicle, has mounted on it so as to run along the frame a number of tubes 7, 8, 9, and 10. It will be appreciated that some of these could be wires, pipes, or other elongated members; however, they will be referred to as tubes for conciseness.

The support plate 6 has a front surface 12 which may be the upper surface, or may be a side surface or a lower surface, and has a rear surface 14 opposite the front surface. The support plate 6 is punched and formed in an operation which may be referred to as lancing to provide an opening 15 and a tongue 16, the tongue being defined by all or, as illustrated, part of the material punched from the support plate in punching the opening 15. The tongue extends from the front surface 12 of the plate and includes a terminal portion 18 which extends over and generally parallel to the plate 6. The opening 15 has an edge 19 opposite to the tongue 16, and the ends of this edge may be radiused as indicated at 20.

The plate 6 and tongue 16 define a seat or socket between them for a spring clip 24 made of spring steel or other suitable springy or resilient material. A metal clip as shown is preferred but, as will be apparent, the clip could also be made of suitable plastic material. The clip 24 is generally of U-shape, having a first or base leg 25 which rests against the surface 12 of plate 6 and straddles the opening 15, and a second or outer leg 26 which bears against the inner surface of the tongue portion 18. The legs are joined by a return bend at 28. The free end of the second leg is bent inwardly toward the first leg to provide a ramp 21 which, as shown particularly in FIG. 4, facilitates the insertion of the clip into the socket.

Figure 4:
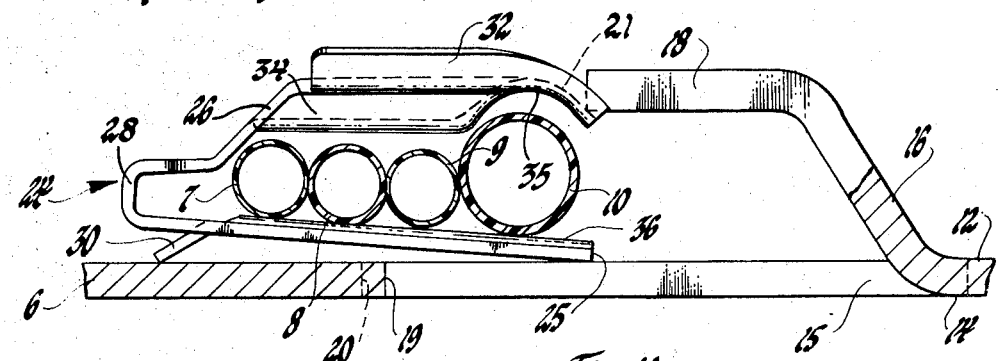
FIG. 4 is a view similar to FIG. 1 illustrating a step in the mounting of the clip on the base plate.
Figure 5:
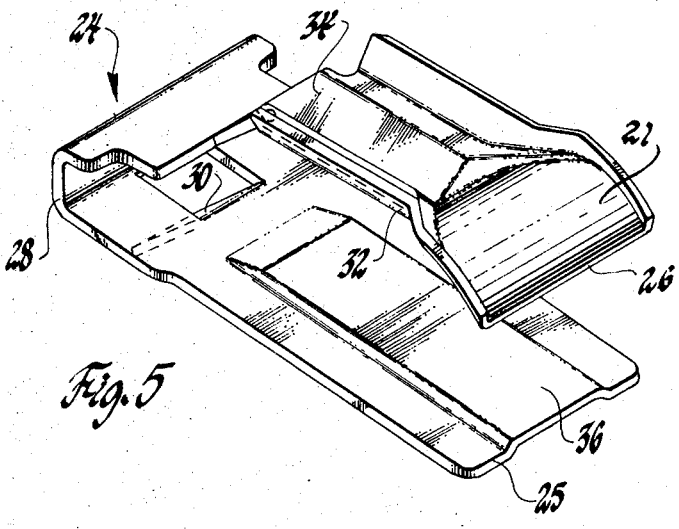
FIG. 5 is an axonometric view of the clip.

To install the clip, the tubes 7 through 10 may be dropped into the open end of the clip, after which the clip is inserted in a manner which will be clearly apparent from FIG. 4 showing the beginning of the insertion and FIG. 1 showing the clip fully mounted in the seat. As the clip is pushed to the right as illustrated in FIG. 4, the ramp 21 compresses the clip so that the outer leg slides under the tongue portion 18 and the leg 25 slides over the surface of the support plate. A tang or spur 30 struck from the base leg 25 slides over the support plate until the clip is in position, after which it bears against the edge 19 of the hole to prevent the clip from sliding back out of its seat.

The lateral edges of the outer leg 26 bear outwardly extending flanges 32 which engage the edges of the tongue portion 18 to guide the clip in insertion and to hold it against movement perpendicular to the view of FIG. 1 when it has been inserted.

Depending upon the installation and upon the proportions of the tubes which are to be mounted, it is in many cases desirable to particularly adapt the clip for a snug fit against the tubes. As illustrated in the drawing, the outer leg 26 is embossed to provide a ridge 34 on its inner surface which bears against the smaller tubes 7, 8, and 9 and provides with the inwardly curved ramp 21 a curved seat 35 which fits the tube 10. Also, the base leg 25 is preferably embossed to provide a raised surface 36 down the center of the leg, this serving to provide slightly more clearance between the tubes and the support plate. The embossments 34 and 36 also stiffen the legs. Tubes can be installed after the clip 24 is in place as, for example, the small tube 38 indicated in FIG. 1 which has been run through the space defined between the clip and its seat.

As will be seen, the tubes can easily be put into the clip, then the clip simply shoved into place in its seat. To remove the clip, it is only necessary to lift outwardly on the return bend 28 to free the spur 30 from the plate and then pull the clip from its seat. The convenience, economy, and adequacy of the arrangement will be obvious to those skilled in the art.

The detailed description of the preferred embodiment of the invention for the purpose of explaining the principles thereof is not to be considered as limiting or restricting the invention, as many modifications may be made by the exercise of skill in the art.

I claim:

1. An arrangement for supporting and retaining elongated members such as piping, tubing, wiring, and the like comprising, in combination; a rigid support plate having an opening and a tongue extending out from the plate and over the opening in the plate generally parallel to the surface of the plate; and a spring clip cooperating with the plate and tongue to define a closed loop to encircle the elongated members, the clip being generally of U-shape with a base leg and an outer leg, the base leg engaging the plate and bridging the said opening and the outer leg bearing against the tongue so that the legs are pressed toward each other and resiliently bear against the plate and tongue, respectively, the clip being slidable into position between the plate and tongue, and means on the plate and clip positively retaining the clip in position.

2. An arrangement as recited in claim 1 in which the free end of the outer leg converges toward the base leg to define a ramp to facilitate entering the clip under the tongue.

3. An arrangement as recited in claim 1 in which the outer leg bears outwardly extending flanges adapted to bear against the sides of the tongue to block lateral displacement of the clip.

4. An arrangement as recited in claim 3 in which the free end of the outer leg converges toward the base leg to define a ramp to facilitate entering the clip under the tongue.

5. An arrangement as recited in claim 1 in which at least one leg has an interior profile varying along its length to fit the gap between the legs to elongated members of varying size.

6. An arrangement as recited in claim 1 in which the legs are embossed inwardly and lengthwise of the legs to stiffen the legs and provide surfaces engaging the elongated members.

7. An arrangement as recited in claim 1 in which the clip bears a spur on the base leg providing a detent against an edge of the opening to retain the clip in position.

8. A clip adapted for insertion into a seat defined between a support plate and a tongue extending from and extending over and generally parallel to the support plate and to define an encircling enclosure with the seat for elongated members such as piping, tubing, wiring, and the like, the clip being of resilient material in generally U-shape with two generally parallel legs joined by a return bend, the first leg being adapted to rest upon the plate and the second leg being adapted to bear against the tongue, with the clip resiliently compressed so as to bear outwardly against the plate and tongue, the second leg having a ramp at its free end to compress the clip upon insertion into the seat and bearing flanges at its lateral edges to bear against the edges of the tongue to guide the clip into the seat and hold it against lateral movement when seated, the first leg including a spur slidable over the plate and adapted to bear against the edge of an opening in the plate to hold the clip against sliding from the seat.

9. A clip as recited in claim 8 in which at least one leg has an interior profile varying along its length to fit the gap between the legs to elongated members of varying size.

10. A clip as recited in claim 8 in which the legs are embossed inwardly and lengthwise of the legs to stiffen the legs and provide surfaces engaging the elongated members.